O. J. WYMAN.
FARM GATE.
APPLICATION FILED JULY 17, 1911.
1,011,548.
Patented Dec. 12, 1911.
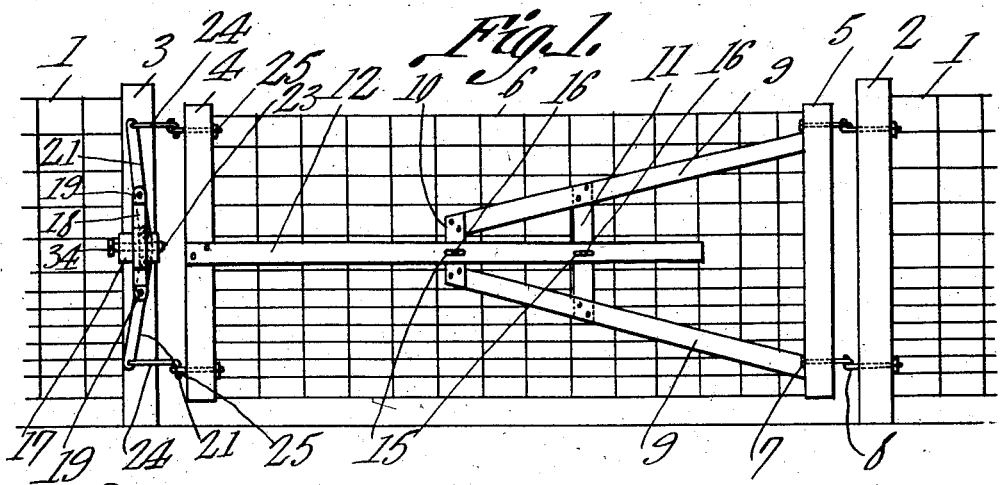
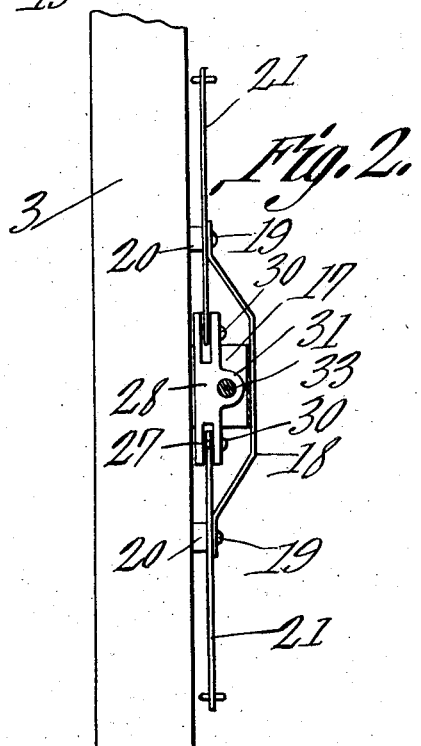
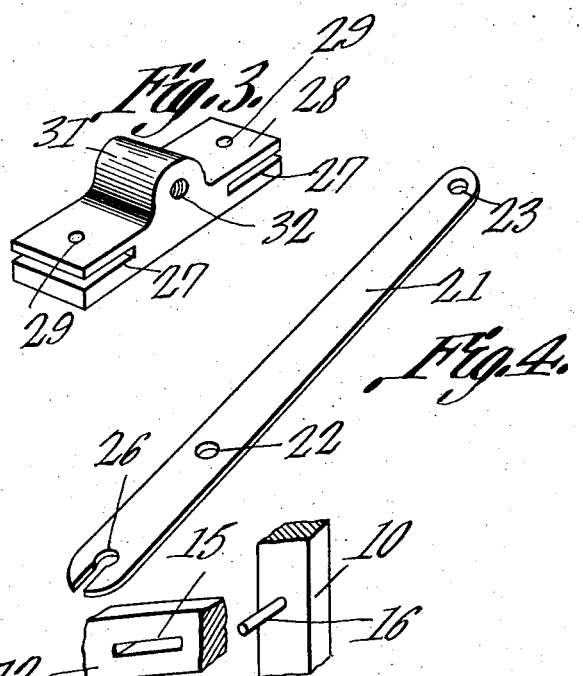
Witnesses
Inventor
O. J. Wyman,
by C. A. Snow & Co.
Attorneys

UNITED STATES PATENT OFFICE.

ORRIN J. WYMAN, OF ALBION, NEW YORK.

FARM-GATE.

1,011,548.  Specification of Letters Patent.  Patented Dec. 12, 1911.

Application filed July 17, 1911. Serial No. 639,019.

*To all whom it may concern:*

Be it known that I, ORRIN J. WYMAN, a citizen of the United States, residing at Albion, in the county of Orleans and State of New York, have invented a new and useful Farm-Gate, of which the following is a specification.

It is the object of the present invention, to provide a longitudinally extensible gate, of novel and improved form, which gate, although longitudinally extensible, will be braced, transversely, thereby preventing sagging of the outer or free end of the gate.

A further object of the invention is to provide a novel form of stretching mechanism, adapted to elongate a longitudinally extensible gate.

A further object of the invention is to provide a novel form of supporting structure for a flexible gate, which structure will permit the gate to expand longitudinally, without permitting the gate to sag, or bend transversely.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in side elevation, a gate constructed in accordance with the present invention; Fig. 2 is an edge elevation of the stretching mechanism, together with the supporting structure whereby the same is carried; Fig. 3 is a perspective of the traveler which enters into the stretching mechanism; Fig. 4 is a perspective of one of the levers which form a part of the stretching mechanism; and Fig. 5 is a fragmental perspective showing certain coöperating elements upon the gate structure, to permit a longitudinal extension of the gate, without permitting the same to sag, or yield transversely.

In the drawings, the numeral 1 denotes the fence, which may be of any form, the fence being secured to posts 2 and 3, the post 3 constituting the supporting structure for the stretching mechanism hereinafter described.

The gate which is located between the posts 2 and 3, is a longitudinally extensible structure, and comprises end bars 4 and 5, united by a filler 6, preferably fashioned from ordinary wire fencing of any desired form. The gate may be connected in any chosen manner with the post 2. If desired, eye bolts 7 may be mounted in the post 5, the eye-bolts 7 being adapted to coöperate with right angle hooks 8, secured to the post 2.

A structure is provided which will permit the gate to expand longitudinally, without permitting the gate to sag, or yield transversely. This structure embraces a pair of converging side members 9, secured at their outer ends to the bar 5 of the gate, the inner, adjacent ends of the members 9 being united by an end piece 10. The side members 9 are connected, intermediate their ends, by a transverse brace 11. A slide bar 12 is provided, the outer end of which is secured to the bar 4, intermediate the ends of the bar. The inner end of the slide bar 12 extends across the end piece 10, and across the intermediate brace 11. In the slide bar 12 there are longitudinally extended slots 15, located opposite the end piece 10, and opposite the intermediate brace 11, there being in these elements 10 and 11, outstanding pins 16, adapted to register slidably in the slots 15.

From the foregoing it will be seen that the pin and slot connection, embracing the elements 15—16, will permit the slide bar 12 to move longitudinally upon the elements 10 and 11, the construction being such, however, that the slide bar 12 cannot tilt transversely. The end bars 4 and 5 of the gate may, therefore, be separated, but a vertical sagging of the filler 6 will nevertheless, be impossible. A stretching mechanism is provided whereby the longitudinally extensible gate hereinbefore set forth, may be elongated. For this stretching mechanism, the post 3 constitutes a supporting structure. Secured to the post 3, transversely of the same, is an arched bracket 17. Disposed longitudinally of the post 3, and bearing in its intermediate portion upon the bracket 17 is an arched truss member 18. Through the ends of the truss member 18, securing elements 19 are passed, into engagement with the post 3, spacing blocks 20 being carried by the elements 19. A pair of levers 21 are provided, the same having, intermediate their ends, openings 22, adapted to receive the securing elements 19, the elements 19 thus constituting fulcrums for the levers. In the outer end portions of the levers 21, there are openings 23, adapted to receive, pivotally, hooks 24, or other means, adapted to effect a removable connection between the levers 21 and eyes 25 which outstand from the end bar 4 of the gate. The inner ends of the levers 21 are slotted, as shown at 26, and these slotted ends of the levers are received within slots 27, formed in the ends of a traveler 28, located within the arched bracket 17. The spacing blocks 20, against which the levers 21 bear, serve to maintain the levers properly positioned, so that their inner ends will be received within the slots 27 of the traveler 28. In the traveler 28 there are openings 29, located at right angles to the slots 27. Through the openings 29 pivot elements 30 extend, the pivot elements 30 being received loosely within the slots 26 in the inner ends of the levers 21. The traveler 28 is formed at one side with an outstanding boss 31, having a threaded opening 32, adapted to receive a screw 33, disposed transversely of the post 4, and threaded into the bracket 17, the screw 33 being provided at one end with a suitable head 34, whereby the screw may be rotated.

It will be seen that by freeing the hooks 24 from the eyes 25, the gate may be swung readily upon the pivotal mounting 7—8. Owing to the pin and slot connection 15—16, between the bar 12 and the members 10 and 11, the gate may be elongated. However, since the bar 12 is connected with the frame 9—10—11— at spaced points, a sagging of the gate will be prevented. By rotating the screw 33, the traveler 28 will be advanced and retracted, the traveler, in its movement transversely of the post 3, upon the screw 33, serving to effect a tilting of the levers 21, upon their fulcrum elements 19, the outer ends of the levers 21 exerting a pull upon the hooks 24, the hooks 24, in their turn, exerting a pull upon the end bar 4 of the gate, whereby the flexible filler 4 will be stretched taut.

Having thus described the invention, what is claimed is:—

1. A gate comprising posts; a flexible filler uniting the posts; a frame secured to one post; a bar secured to the other post and extended across the frame; the bar and the frame being connected by a pin and slot union, the slots of which extend transversely of the posts; means for pivotally supporting one post; and stretching mechanism adapted to engage the other post.

2. A device of the class described comprising spaced posts; a flexible filler uniting the posts; spaced side members secured at one end to one post; an end piece uniting the other ends of the side members; an intermediate brace uniting the side members, between their ends; pins outstanding from the end piece and from the brace; a bar secured at one end to the other post and having longitudinally extended slots adapted to receive the pins; means for pivotally supporting one post; and stretching mechanism adapted to engage the other post.

3. A device of the class described comprising a supporting structure; a bracket thereon; a screw threaded into the bracket; a traveler into which the screw is threaded; levers fulcrumed intermediate their ends upon the supporting structure and loosely engaged at their adjacent ends with the traveler; a longitudinally extensible gate; and means for removably connecting the outer ends of the levers with one end of the gate.

4. A device of the class described comprising a supporting structure; a bracket thereon; a screw threaded into the bracket; a traveler through which the screw is threaded, the traveler being provided with slots in its ends; securing elements extended through the traveler, across the slots; levers fulcrumed intermediate their ends upon the supporting structure, and having their inner ends disposed within the slots of the traveler, the inner ends of the levers being provided with elongated openings adapted to receive the securing elements; a longitudinally extensible gate; and means for removably securing the outer ends of the levers to the gate.

5. A device of the class described comprising a supporting structure; a bracket extended transversely of the supporting structure; a truss member extended longitudinally of the supporting structure and bearing in its intermediate portion upon the bracket; securing elements uniting the ends of the truss member with the supporting structure; levers fulcrumed intermediate their ends upon the securing elements; a screw threaded into the bracket; a traveler into which the screw is threaded, the traveler being slotted in its ends, the levers having their inner ends received within the slot of the traveler; securing devices extended through the traveler, across the slots thereof, and loosely engaged with the inner ends of the levers; a longitudinally extensible gate; and means for removably securing the outer end portions of the levers to one end of the gate.

6. A device of the class described comprising a supporting structure; a bracket secured to the supporting structure transversely of the same; a truss member disposed longitudinally of the supporting structure, and having its intermediate portion bearing upon the bracket; securing elements uniting the ends of the truss member with the supporting structure; levers fulcrumed intermediate their ends upon the securing elements; a screw threaded into the bracket; a traveler into which the screw is threaded, the inner ends of the levers being loosely engaged with the traveler; a longitudinally extensible gate; and means for securing the outer end portions of the levers to one end of the gate.

In testimony that I claim the foregoing as my own, I have hereto affixed my signature in the presence of two witnesses.

ORRIN J. WYMAN.

Witnesses:
NATHAN S. R. GILBERT,
WM. H. DURNIN.

Copies of this patent may be obtained for five cents each, by addressing the "Commissioner of Patents, Washington, D. C."